US012310923B2

(12) United States Patent
Eshuis et al.

(10) Patent No.: US 12,310,923 B2

(45) Date of Patent: May 27, 2025

(54) COMPOUNDING SYSTEM

(71) Applicant: THE COMPOUNDING COMPANY B.V., Heemstede (NL)

(72) Inventors: Ronnie Eshuis, Heemstede (NL); Sebastiaan Loon Van, Heemstede (NL)

(73) Assignee: THE COMPOUNDING COMPANY B.V., Heemstede (NL)

( * ) Notice: Subject to any disclaimer, the term of this patent is extended or adjusted under 35 U.S.C. 154(b) by 0 days.

(21) Appl. No.: 18/855,290

(22) PCT Filed: Apr. 14, 2023

(86) PCT No.: PCT/NL2023/050198

§ 371 (c)(1),
(2) Date: Oct. 8, 2024

(87) PCT Pub. No.: WO2023/204699

PCT Pub. Date: Oct. 26, 2023

(65) Prior Publication Data

US 2025/0114277 A1 Apr. 10, 2025

(30) Foreign Application Priority Data

Apr. 17, 2022 (NL) ...................................... 2031611
Oct. 13, 2022 (NL) ...................................... 2033305

(51) Int. Cl.
*A61J 1/20* (2006.01)
*A61J 1/16* (2023.01)
(Continued)

(52) U.S. Cl.
CPC ................. *A61J 3/002* (2013.01); *A61J 1/16* (2013.01); *A61J 1/20* (2013.01); *A61J 1/10* (2013.01); *B65B 3/003* (2013.01)

(58) Field of Classification Search
CPC ........ A61J 1/10; A61J 1/16; A61J 1/20; A61J 3/00; A61J 3/002; B65B 3/00; B65B 3/003
See application file for complete search history.

(56) References Cited

U.S. PATENT DOCUMENTS 5,884,457 A * 3/1999 Ortiz ..................... B65B 7/2835 53/492
7,783,383 B2 * 8/2010 Eliuk ...................... A61J 3/002 700/214

(Continued)

FOREIGN PATENT DOCUMENTS

EP 1997471 A1 12/2008
WO WO-2017158398 A1 * 9/2017 ................ A61J 1/20

OTHER PUBLICATIONS

International Search Report and Written Opinion for PCT/NL2023/050198 mailed on Jun. 20, 2023, 10 pages.

*Primary Examiner* — Nicolas A Arnett
(74) *Attorney, Agent, or Firm* — AEON Law, PLLC; Adam L. K. Philipp; Charlotte E. Holoubek

(57) ABSTRACT

According to the invention, a compounding system for dosing a compound in a container comprising: a container body enclosing a container volume for holding the compound; and a plunger adapted to change the container volume; wherein the compounding system comprises: a container body holder for holding the container body; and a plunger holder for holding the plunger; and wherein the compounding system further comprises: container body bias means providing a container body bias for biasing the container body in the container body holder; wherein a residual force on the plunger relative to the container body after changing the container volume is less than the container body bias; or plunger bias means providing a plunger (Continued)

bias for biasing the plunger in the plunger holder, wherein the residual force is less than the plunger bias.

19 Claims, 8 Drawing Sheets

(51) Int. Cl.

| | |
|---|---|
| ***A61J 3/00*** | (2006.01) |
| *A61J 1/10* | (2006.01) |
| *B65B 3/00* | (2006.01) |

(56) References Cited

U.S. PATENT DOCUMENTS

| | | | | |
|---|---|---|---|---|
| 11,559,468 | B2 * | 1/2023 | Oda | B65B 3/30 |
| 12,150,913 | B2 * | 11/2024 | Bosscher | A61J 1/2096 |
| 2009/0126825 | A1 * | 5/2009 | Eliuk | B65B 3/003 141/330 |
| 2011/0062703 | A1 * | 3/2011 | Lopez | A61J 1/201 285/129.1 |
| 2011/0100501 | A1 * | 5/2011 | Mizuno | A61J 3/002 141/2 |
| 2011/0172810 | A1 * | 7/2011 | Mlodzinski | G07F 11/1657 250/455.11 |
| 2015/0374585 | A1 * | 12/2015 | Mansour | B01F 33/841 141/105 |
| 2017/0008651 | A1 * | 1/2017 | Lizari Illarramendi | B65B 43/54 |
| 2020/0085691 | A1 * | 3/2020 | Mansour | A61J 7/0069 |
| 2022/0062107 | A1 * | 3/2022 | Bianco | A61J 1/2096 |
| 2022/0202648 | A1 * | 6/2022 | Berger | A61J 1/201 |
| 2022/0223248 | A1 * | 7/2022 | Kemp | A61J 3/002 |

* cited by examiner

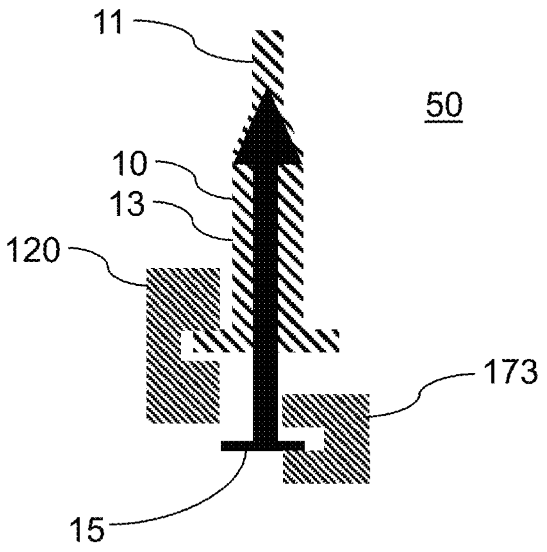
(prior art) Fig. 1
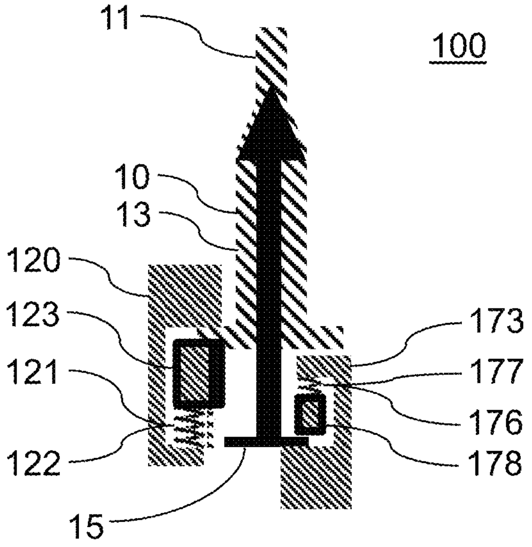
Fig. 2

COMPOUNDING SYSTEM

FIELD OF THE INVENTION

The invention relates to a compounding system. The invention more specifically relates to dosing a compound in a container held by the compounding system. The invention further relates to a method for dosing a compound in a container held by the compounding system.

BACKGROUND OF THE INVENTION

Pharmacies, especially hospital pharmacies, have to compound medicines. These medicines may be compounded in the form of pills, but also in the form of syringes or infusion bags filled with a compounded substance. This compounding may be automated by coupling a syringe or infusion bag to a compounding system.

For example, US2017008651A1 discloses a machine and a method for the automatic preparation of substances for intravenous application. The machine works by puncturing a container with the needle of a syringe for thereafter drawing a liquid from the container in the syringe. US2017008651A1 further discloses in FIG. 8 a machine for dosing a compound in the container. Disadvantages of US2017008651A1 are that the machine is bulky, and mechanically complex. Furthermore, dosing with the disclosed machine is inaccurate.

SUMMARY OF THE INVENTION

An object of the invention is to overcome one or more of the disadvantages mentioned above. According to a first aspect of the invention, a compounding system for dosing a compound in a container comprising: a container body enclosing a container volume for holding the compound; and a plunger adapted to change the container volume; wherein the compounding system comprises: a container body holder for holding the container body; and a plunger holder for holding the plunger; and wherein the compounding system further comprises: container body bias means providing a container body bias for biasing the container body in the container body holder; wherein a residual force on the plunger relative to the container body after changing the container volume is less than the container body bias; or plunger bias means providing a plunger bias for biasing the plunger in the plunger holder, wherein the residual force is less than the plunger bias.

A compounding system is a system arranged for compounding substances, such as liquids or gels. The compounded substance is typically collected in a container. Alternatively, the container collects the different substances making up the compounded substance. The container is typically used for transporting and/or temporarily storing the compounded substance. The compounded substance in the container may be administered to a patient.

The compounding system is typically used in medical settings, such as in a hospital pharmacy, for compounding syringes and/or infusion bags. The compounding system advantageously may alleviate manual labour. Furthermore, the compounding system may replace manual operation preventing dosing failures. Both these advantages may also apply to the automated dosing of the container.

The container is typically a syringe. Syringes are typically standardized in the medical sector. The container has a container body typically provided with an inner space or a volume for holding or containing the compounded substance. The container also has a plunger typically arranged inside the container body for controlling, regulating and/or changing the container volume. The container body may have an elongated shape defining an elongated axis. The plunger may also have an elongated shape. The plunger may further be shaped to travel inside the container body along the elongated axis for controlling, regulating and/or changing the container volume.

The compounding system comprises a container body holder. The container body holder holds the container body at a particular position and/or orientation. The compounding system comprises a plunger holder. The plunger holder holds the plunger at a particular position and/or orientation. The container body holder and the plunger holder are typically arranged relative to each other for dosing the compound. The container body holder and the plunger holder may move relative to each other for dosing a compound in the container, such as moving apart for increasing the container volume for increasing the compound and moving towards each other for decreasing the container volume for decreasing the compound. The container body holder and/or the plunger holder may have some play.

The compounding system may hold one or more supply volumes of compounds or ingredients for the compound for supplying a compound to the container. These one or more supply volumes may be coupled to the container directly or indirectly for example via tubes and/or spikes in the compounding system. The supply volumes typically are standardized supply volumes, such as vials or bags. A supply volume may hold pre-mixed compounds or ingredients for the compound. For preventing under pressure in a supply volume during that an ingredient or a compound is drawn from the supply volume, the supply volume and/or a coupling element, such as a tube or spike, may have a vent. This vent typically incorporates anti-bacterial, anti-viral or other counter measures preventing contamination mixing with the compound or the ingredient of the compound. This vent or absence of this vent, and the optional counter measures cause a temporary under pressure when a compound is drawn into the container during dosing. This under pressure causes a residual force and/or a resulting force on the container, typically on the plunger relative to the container body, for reducing the container volume for compensating or cancelling the under pressure. The residual force and/or the resulting force is typically fading in time typically due to the presence of the vent or other optional counter measures intended to allow this fading in time. During the fading in time of the residual force, the container body and/or the plunger may show unwanted movement, such as creep or crawl, in a direction reducing the residual force. This creeping or crawling of the container body and/or the plunger causes a change in container volume and thus an inaccuracy in the doses compound. The production of containers holding a dosed compound is such that this residual force is not yet faded away when the dosed container is removed from the compounding system. Furthermore, the residual force causes the container volume to be off resulting in that the amount of dosed compound is incorrect, and typically too low. The inaccuracy is typically such big that the required accuracies in the medical field are not met. The container body bias means and/or the plunger bias means hold the container body and/or the plunger, respectively, in place preventing creep, change or move due to play in the respective holder in combination with the residual force resulting from the dosing to influence the container volume. The bias force should exceed the residual force. The technical effect of the container body bias means and/or the plunger bias means is that the container volume can be controlled with an increased accuracy after dosing the compound. Furthermore, it is an advantage to use one type or a limited number of types of containers in the compounding system. The increased accuracy of the dosed compound allows to select a larger container for use in the compounding system while the compounding system as a whole is able to dose fluids over a larger range of volumes with required accuracy over the full range, specifically small volumes with a large container. The ability of dosing small volumes with required accuracy with a large container has the technical effect of simplifying and/or standardizing the plunger holder and the container body holder simplifying the compounding system as a whole. As an example, for the simplification, the minimum distance between the end of the plunger and the flanges on the container body are different for different container volumes. This distance may cause that there is not enough space for gripping the container body and the plunger, such as with the plunger hook at minimum distance and/or the plunger end does not fit between the plunger hook and the plunger platform.

According to another aspect of the invention, a method for use of a compounding system as described. The method provides the same advantages as mentioned for the compounding system.

According to another aspect of the invention, a method for a compounding system for dosing a compound in a container comprising: a container body enclosing a container volume for holding the compound; a plunger adapted to change the container volume; wherein the compounding system comprises: a container body holder for holding the container body; and a plunger holder for holding the plunger; wherein the compounding system further comprises: container body bias means providing a container body bias for biasing the container body in the container body holder; wherein a residual force on the plunger relative to the container body after changing the container volume is less than the container body bias; or plunger bias means providing a plunger bias for biasing the plunger in the plunger holder, wherein the residual force is less than the plunger bias; wherein the method comprises: arranging the container body in the container body holder; arranging the plunger in the plunger holder; engaging, preferably after arranging, the container body bias means and/or the plunger bias means; moving, after arranging, the plunger holder relative to the container body holder for dosing a compound. The method provides the same advantages as mentioned for the compounding system.

DETAILED DESCRIPTION OF EXEMPLARY EMBODIMENTS

In an embodiment of the compounding system, the compounding system advantageously comprises the container body bias means and the plunger bias means. Preventing play in both of the holders provides the advantage of higher accuracy of the dosed compound.

In an embodiment of the compounding system, the container body holder and the plunger holder are kept stationary relative to each other after changing the container volume. Typically, when the container body moves relative to the plunger the container volume changes. Keeping the holders stationary relative to each other, and as the holders hold the container body and the plunger advantageously keeps the container volume unchanged. During that the container body holder and the plunger holder are kept stationary, the under pressure caused by increasing the container volume during dosing typically will fade or subside over time typically due to a vent or the like.

In an embodiment of the compounding system, increasing the container volume causes a negative pressure in the container volume resulting in a residual force directed to move container body holder and plunger holder towards each other. In an embodiment of the compounding system, decreasing the container volume causes a positive pressure in the container volume resulting in a residual force directed to move container body holder and plunger holder away from each other. During dosing, filling or compounding, the holders may make several movements relative to each other with one container thereby changing the container volume multiple times.

In an embodiment of the compounding system, the maximum absolute value of the residual force advantageously is less than or equal to a negative pressure or a positive pressure generated by the difference between the maximum container volume and the minimum container volume.

In an embodiment of the compounding system, the absolute value of the container body bias exceeds the absolute value of the residual force generated by the difference between the maximum container volume and the minimum container volume. In an embodiment of the compounding system, the absolute value of the plunger bias exceeds the absolute value of the residual force generated by the difference between the maximum container volume and the minimum container volume. In a preferred embodiment of the compounding system, the absolute value of the container body bias exceeds the absolute value of the residual force generated by the difference between the maximum container volume and the minimum container volume; and the absolute value of the plunger bias exceeds the absolute value of the residual force generated by the difference between the maximum container volume and the minimum container volume.

In an embodiment of the compounding system, the container comprises a first coupling part; the compounding system comprises: a frame; and a coupling holder for holding a second coupling part for coupling with the first coupling part for forming a coupling; coupling comprises a rotational movement; and the compounding system comprises: container body holder rotational means for allowing the container body, preferably together with the container body bias means, rotate relative to the frame; and/or plunger holder rotational means for allowing the plunger, preferably together with the plunger bias means, rotate relative to the frame. The container typically comprises a rotational coupling for fluid coupling the container with one of the reservoirs for dosing the compound. The coupling and decoupling may cause the container to rotate. This rotation of the container or parts of the container especially during decoupling may cause the container body and the plunger to creep relative to each other causing inaccuracies in the dosed compound volume. Rotational means reduce the impact of the residual force during decoupling. Further, this impact is further reduced when the bias means rotate together with the respective part of the container. Hence, the rotational means have the technical effect of reducing the impact of decoupling on the dosed compound volume. In a further embodiment of the compounding system, the first coupling part and the second coupling part are Luer coupling parts for forming a Luer coupling. A Luer coupling is advantageously selected as an easy-to-use coupling in the medical field.

In a further embodiment of the compounding system, the compounding system comprises a plunger slider translationally coupled to the frame; wherein the plunger holder rotational means comprise a first rotational part fixated to the plunger holder, and a second rotational part fixated to the plunger slider; wherein the first rotational part and the second rotational part are rotationally arranged such that when the container is present and the container body holder is rotated, the plunger follows a rotation of the container body. Arranging the plunger for rotatable following the container body reduces the risk of leakage between the container body and the plunger. Furthermore, arranging the plunger for rotatable following the container body prevents or reduces twisting the plunger and consequently increases the accuracy of the volume held in the container.

In a further embodiment of the compounding system, the plunger holder rotational means are passive. Passive plunger holder rotational means provide the advantage of simplifying the design, such as the mechanical and/or control design of the compounding system. Furthermore, reliability is increased of the compounding system with this simplification.

In an embodiment of the compounding system, the container body has an elongated shape; the elongated shape defines an elongated axis; and the elongated axis aligns with the plunger. In a further embodiment of the compounding system, the plunger holder rotational means defines a rotational axis substantially the same as the elongated axis. The plunger has an elongated shape shaped to snugly fit in the container body for determining the container volume. The elongated axis is preferably aligned or substantially aligned to the rotational axis of the plunger holder rotational means. Further, the elongated axis is preferably aligned to the Luer coupling, when present. Aligning the elongated axis, the rotational axis and the axis of rotation of the Luer coupling allows the rotational means to control the coupling of container to the compounding system via a Luer coupling.

In a further embodiment of the compounding system, the plunger holder comprises a plunger platform for placing the plunger onto the platform; and the plunger bias means comprise: at least one plunger hook for hooking the plunger holder onto the platform; and a with each plunger hook associated plunger spring arranged for together with the associated hook providing the plunger bias. The plunger hook is an advantageous solution for gripping the plunger. Furthermore, the spring advantageously allows to press the plunger hook onto the plunger for providing the plunger bias thereby preventing creep of the plunger. It is noted that in case of multiple plunger hooks, the number of plunger springs may be more, less or equal to the number of plunger hooks. It is further noted that in case of less plunger springs relative to the multiple plunger hooks, one or more of the plunger springs may be shared between two or more plunger hooks.

In a further embodiment of the compounding system, the at least one plunger hook is rotationally arranged for rotating around the platform; the platform comprises an edge; and the at least one plunger hook is advantageously arranged at the edge of the platform. The axis of rotation of the at least one plunger hook is typically in the plane of the platform and/or perpendicular to the rotational axis of the plunger holder rotational means, alternatively parallel to the plane of the platform.

In a further embodiment of the compounding system, the at least one hook is positionable in an open position wherein a plunger is placeable on the platform, and a closed position wherein the plunger bias is applied to the plunger; and the at least one hook is shaped such that while the plunger is placed onto the platform along the rotational axis, the at least one hook is advantageously forced from the closed position to the open position. The shape of the at least one hook provides the advantage that no further active components are necessary in the compounding system simplifying the system in general while adding a functional feature.

In a further embodiment of the compounding system, the at least one hook is positionable in an open position wherein a plunger is placeable on the platform, and a closed position wherein the plunger bias is applied to the plunger; and the at least one hook is shaped such that when a plunger is placed on the platform and the hook is in the closed position, a pulling force on the plunger away from the platform causes the at least one hook to advantageously firmer grip the plunger or at least not release its grip on the plunger. The shape of the at least one hook provides the advantage that no further active components are necessary in the compounding system simplifying the system in general while adding a functional feature.

In an embodiment of the compounding system, the container body bias means comprises a spring, a leaf spring, a coil, an elastic member and/or a resilient member for biasing the container body onto the container body holder. In an embodiment of the compounding system, the plunger bias means comprises a spring, a leaf spring, a recoil spring, a coil, an elastic member and/or a resilient member for biasing the plunger onto the plunger holder. A spring, coil, elastic member and/or resilient member is advantageously easily biased for providing bias to the container body means and/or the plunger bias means.

In an embodiment of the compounding system, the container body bias means and/or the plunger bias means advantageously comprise a thread and a fixation for screwing the fixation onto the container body or plunger for biasing the container body and/or the plunger onto the container body holder and/or the plunger holder, respectively.

In an embodiment of the compounding system, the container body comprises flanges extending from the container body; and the container body holder is shaped for receiving the flanges for holding and/or gripping the container. A gripping of the container body may advantageously provide the container body bias.

In an embodiment of the compounding system, the plunger has an elongated shape having an elongated axis and is shaped to be arranged at least partly inside the container body. In an embodiment of the compounding system, the plunger is piston shaped and is shaped to snugly fit at least partly inside the container body. In an embodiment of the compounding system, the plunger comprises a flange; and the plunger holder is shaped for receiving the flange for holding and/or gripping the plunger.

In an embodiment of the compounding system, the plunger holder moves relative to the container body holder for changing the container volume. In an embodiment of the compounding system, the container is a medical container, such as a syringe. In an embodiment of the compounding system, the compounding system comprises a loading bay for loading a reservoir for holding a supply of the to be dosed compound or an ingredient of the to be dosed compound.

In an embodiment of the method for the compounding system, the method comprises the steps of: moving, after arranging, the plunger holder relative to the container body holder for decreasing the container volume before moving for dosing. The fluid held before dosing the compound may advantageously be expelled from the container before dosing. Before dosing, the container may advantageously also be rinsed from any contamination by first introducing a rinsing fluid in the container volume whereafter the fluid is first expelled from the container before dosing the compound. The compounding system may advantageously comprise a structure, such as a valve structure, for accommodating this rinsing of the container. Before moving for dosing, the container may advantageously expel gas or fluid held in the container volume.

In an embodiment of the method for the compounding system, the method comprises the steps of: increasing the container volume such that the container volume is larger than required dose of compound; and decreasing the container volume such that the container volume is equal or substantially equal to the required dose of compound. By overshooting the required amount of compound to be dosed, and thereafter dosing or tuning back the amount of compound advantageously allows to reduce the residual force after dosing. This reduction may involve drawing, preferably with additional force and/or movement, air through the optional vent of the supply volume.

In an embodiment of the compounding system, the container is a medical container, such as a syringe. In an embodiment of the compounding system, the container comprises a container body having an elongated shape, wherein preferably the elongated shape defines an elongated axis, and the elongated axis advantageously aligns with the first coupling axis. A substantially circular symmetrical container, preferably a substantially circular symmetrical container body and/or a first Luer coupling end, provide ease of production and/or handling during filling or dosing of the container.

In an embodiment of the compounding system, the container comprises flanges extending from the container body; and the container holder is shaped for receiving the flanges for rotationally and/or translationally gripping the container. The container holder advantageously grips the flanges typically used by fingers during use such as expelling fluid from the container.

BRIEF DESCRIPTION OF THE DRAWINGS

The invention will be apparent from and elucidated further with reference to the embodiments described by way of example in the following description and with reference to the accompanying drawings, in which:

FIG. 1 schematically shows a detail of a side view of a cross section of a compounding system according to the prior art;

FIG. 2 schematically shows a detail of a side view of a cross section of a compounding system;

The figures are purely diagrammatic and not drawn to scale. In the figures, elements which correspond to elements already described may have the same reference numerals.

Figure 3:
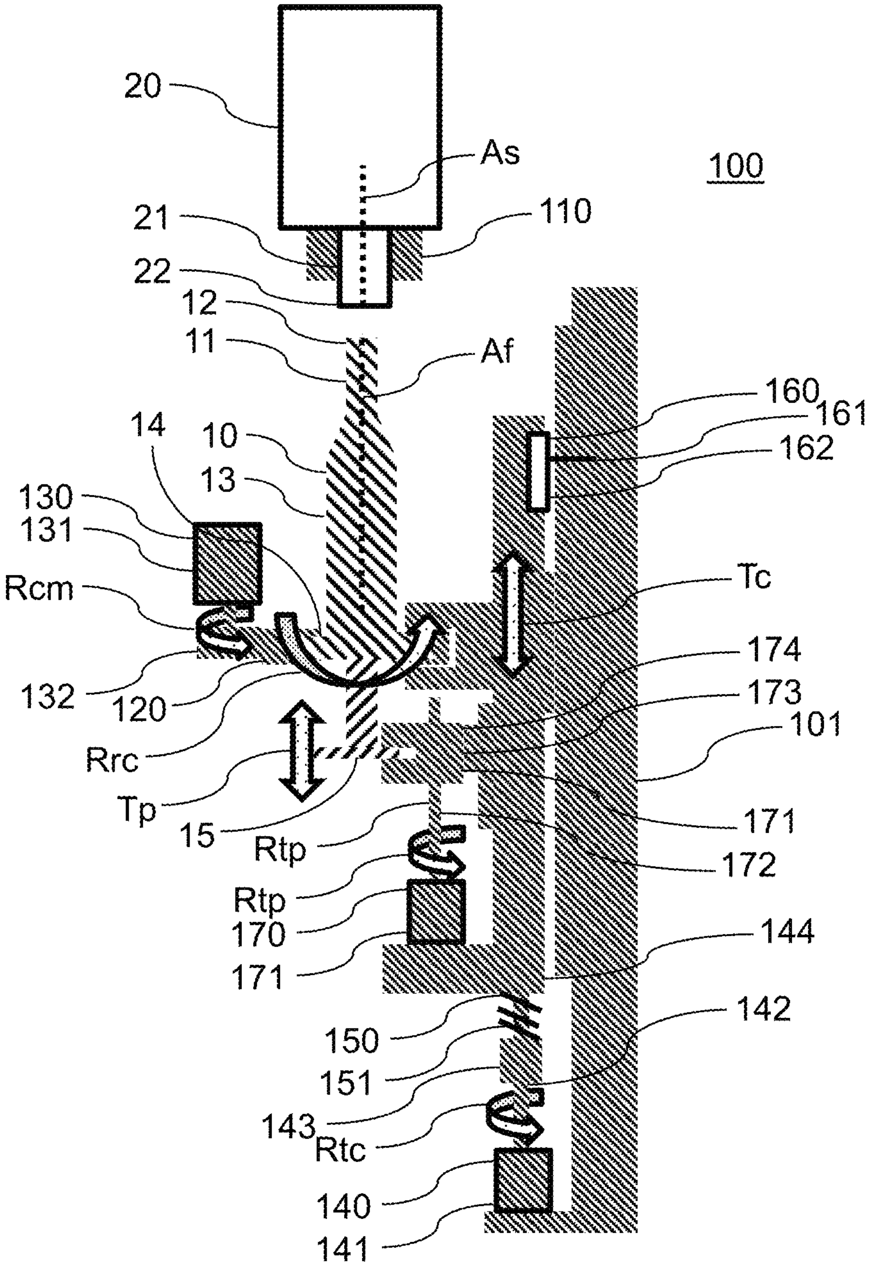
FIG. 3 schematically shows a side view of a cross section of a compounding system.

| LIST OF REFERENCE NUMERALS | |
|---|---|
| 10 | container |
| 11 | first Luer coupling part |
| 12 | first Luer coupling end |
| 13 | container body |
| 14 | flanges |
| 15 | plunger |
| 20 | compound supply |
| 21 | second Luer coupling part |
| 22 | second Luer coupling end |
| 50 | prior art compounding system |
| 100 | compounding system |
| 101 | frame |
| 110 | Luer coupling holder |
| 120 | container holder |
| 121 | container body bias means |
| 122 | container body spring |
| 123 | container body abutment |
| 130 | rotation actuator |
| 131 | rotation motor |
| 132 | gear wheel driving container holder |
| 133 | rotation belt |
| 140 | translation actuator |
| 141 | translation motor |
| 142 | translation spindle |
| 143 | translation spindle nut |
| 144 | translation slider |
| 145 | translation belt |
| 150 | bias means |
| 151 | spring |
| 152 | spring holder |
| 160 | position sensor |
| 161 | detector |
| 162 | detection strip |
| 170 | container fill means |
| 171 | plunger motor |
| 172 | plunger spindle |
| 173 | plunger holder |
| 174 | plunger slider |
| 175 | plunger belt |
| 176 | plunger bias means |
| 177 | plunger spring |
| 178 | plunger abutment |
| 180 | plunger holder rotational means |
| 181 | first rotational part |
| 182 | second rotational part |
| 183 | plunger platform |
| 184 | plunger hook |
| 185 | top shape plunger hook |
| 186 | bottom shape plunger hook |
| 187 | plunger hook tip |
| 188 | plunger hook release |
| 189 | plunger hook body |
| 600 | method for a compounding system |
| 610 | arranging container body in container body holder |
| 620 | arranging plunger in plunger holder |
| 630 | engaging container body bias means and/or plunger bias means |
| 635 | moving plunger relative to container body for decreasing container volume |
| 640 | moving plunger relative to container body for dosing compound |
| 641 | increasing container volume to container volume larger than required |
| 642 | decreasing container volume to container volume equal to required |
| 1000 | computer program product |
| 1010 | computer readable medium |
| 1020 | computer readable code |
| Af | first coupling axis |
| As | second coupling axis |
| Rrc | rotation container motor |
| Rtc | translation container motor |

-continued

| LIST OF REFERENCE NUMERALS | |
|---|---|
| Rtp | translation plunger motor |
| Rph | rotational axis plunger hook |
| Tc | translation container |
| Tp | translation plunger |

DETAILED DESCRIPTION OF THE FIGURES

The following figures may detail different embodiments. Embodiments can be combined to reach an enhanced or improved technical effect. These combined embodiments may be mentioned explicitly throughout the text, may be hint upon in the text or may be implicit.

FIG. 1 schematically shows a detail of a side view of a cross section of a compounding system 50 according to the prior art. The compounding system comprises a container body holder or a container holder 120. The compounding system further comprises a plunger holder 173. The respective holders of the compounding system are shaped and arranged to hold a container 10, such as a syringe, comprising a container body 13 and a plunger 15. The container body is arranged for being held by the container body holder, while the plunger is arranged for being held by the plunger holder.

A typical problem is that the holders allow some play between holder and the part of the container held by the holder. This play together with the residual force after dosing the compound allows the plunger to creep inside the container body compensating the residual force and thereby causing the container volume to change. This change in container volume results in turn in a change in dosed compound having the technical effect of inaccuracy in the dosed compound. The inaccuracy typically exceeds the required accuracy in the medical field, such as for hospital pharmacy.

FIG. 2 schematically shows a detail of a side view of a cross section of a compounding system 100. The compounding system comprises a container body holder or a container holder 120. The compounding system further comprises a plunger holder 173. The respective holders of the compounding system are shaped and arranged to hold a container 10, such as a syringe, comprising a container body 13 and a plunger 15. The container body is arranged for being held by the container body holder, while the plunger is arranged for being held by the plunger holder.

The compounding system may further comprise container body bias means 121. The container body bias means remove the play in the container body holder. The bias force exercised by the container body bias means exceeds the maximum residual force after dosing for preventing the residual force moving and/or shifting the container body relative to the holder. As an example, in this embodiment, the container body bias means may comprise a container body spring 122 and a container body abutment 123. The container body abutment abuts on the container body, more specifically one or more flanges arranged to the container body. The container body spring is arranged between the container body holder and the container body abutment for providing the container body bias preventing any play, creep or shift of the container body relative to the container body holder after dosing. Other embodiments are envisioned and may be distilled from the description for preventing any unwanted movement, play, creep or shift of the container body relative to the container body holder after dosing. Dosing is typically separating a quantity of compound, such as a medicine, also typically at one time. Dosing may be understood as extracting a compound from a vial and introducing this compound in the container. A common procedure is to use a container to dose, to extract or to draw from one supply volume, such as a vial, and to expel, to eject, or to discharge this defined volume of compound in a receiving volume, such as an infusion bag or syringe. Several containers holding different compounds may be used to expel, to eject, or to discharge this defined volume of compound in one single receiving volume to obtain a combined compound. The common procedure has the advantage of reducing the risk of cross contamination between supply volumes.

The compounding system may further comprise plunger bias means 176. The plunger bias means remove the play in the plunger holder. The bias force exercised by the plunger bias means exceeds the maximum residual force after dosing for preventing the residual force moving and/or shifting the plunger relative to the holder. As an example, in this embodiment, the plunger bias means may comprise a plunger spring 177 and a plunger abutment 178. The plunger abutment abuts on the plunger, more specifically one or more flanges arranged to the plunger. The plunger spring is arranged between the plunger holder and the plunger abutment for providing the plunger bias preventing any play, creep or shift of the container body relative to the plunger holder after dosing. Other embodiments are envisioned and may be distilled from the description for preventing any play, creep or shift of the plunger relative to the plunger holder after dosing.

In a preferred embodiment the compounding system comprises container body bias means and plunger bias means for further increasing the accuracy of the dosed compound.

The residual force is depending on the container volume difference caused by the dosing. The residual force may also depend on the speed of changing the container volume which translates in the dosing speed of the compound. The residual force may also depend on the speed of fading of the residual force as the fading may already start during dosing. Slow dosing may cause therefore a lower residual force compared to fast dosing of the compound. The maximum residual force may be calculated by assuming the container volume difference drawing a vacuum in fluidly coupled part of the compounding system with the container volume.

A typical problem is that the holders allow some play between holder and the part of the container held by the holder. This play together with the residual force after dosing the compound allows the plunger to creep, shift and/or move inside the container body compensating the residual force and thereby causing the container volume to change. This change in container volume results in turn in a change in dosed compound having the technical effect of inaccuracy in the dosed compound. The inaccuracy typically exceeds the required accuracy in the medical field, such as for hospital pharmacy.

FIG. 3 schematically shows a side view of a cross section of a compounding system 100. The compounding system comprises a Luer coupling holder 110, a container holder 120, a rotation actuator 130, a translation actuator 140, bias means 150, and a controller. The compounding system may comprise a frame 101 arranged for providing a structure and/or mechanical reference to the compounding system and/or its features. The controller is not shown in FIG. 3. The compounding system is arranged for dosing a compound in a container 10. The container may comprise a container body 13. The container body typically encloses a volume for holding the doses compound. The container may comprise a first Luer coupling part 11 arranged to the container body, and a first Luer coupling end 12 which is a section of the first Luer coupling part and arranged at a distal end of the first Luer coupling part relative to the container body. The first Luer coupling part and/or the first Luer coupling end have a first coupling axis Af. The first coupling axis typically defines the elongated axis and/or the symmetry axis of the first Luer coupling part and/or the first Luer coupling end.

The Luer coupling holder is arranged for holding a second Luer coupling end 21. The Luer coupling holder may be arranged for holding a compound supply 20. The compound supply may be a vial or e.g. a tube to a larger reservoir. Alternatively, the tube may lead to a fluid valve allowing multiple reservoirs or vials to supply a compound or part of the compound. The compound, substances making up the compound, or parts of the compound are typically a fluid, a gel and/or a suspension. The compound supply may comprise a second Luer coupling part 21 arranged for providing the compound, substances making up the compound, or parts of the compound, and a second Luer coupling end 22 providing an opening for fluidly coupling to the first Luer coupling end and/or the first Luer coupling part. The second Luer coupling part and/or the second Luer coupling end have a second coupling axis As. The second coupling axis typically defines the elongated axis and/or the symmetry axis of the second Luer coupling part and/or the second Luer coupling end.

The container holder is arranged for holding the container. The container may comprise flanges 14. The flanges typically extend from the container body. The flanges are typically used for gripping the container for manipulating, such as moving, the container. The container holder may be arranged for gripping the flanges for coupling the container holder and the container in a rotational and translational manner and/or direction. The Luer coupling holder and the container holder are arranged for aligning the first coupling axis and the second coupling axis.

The rotation actuator is arranged for rotating the container holder relative to the Luer coupling holder substantially around the first coupling axis. The rotation actuator may comprise a rotation motor 131, and a gear wheel, belt drive, and/or friction drive 132 driving the container holder. The rotation motor may be coupled with one end with the frame and with a driving axis to the gear wheel for rotating Rrc the gear wheel relative to the frame. The gear wheel may drive the container holder for rotating Rrc the container holder relative to the frame. The Luer coupling holder may be fixated relative to the frame. The rotation motor induces a rotation of the container therefore induces a rotation Rrc of the first Luer coupling end relative to the second Luer coupling end. Rotation is moving one object relative to another object around a rotation axis.

The translation actuator is arranged for translating the container holder relative to the Luer coupling holder along the first coupling axis. The translation actuator may translate the container relative to the frame along the first coupling axis. The translation actuator may comprise a translation motor 141, a translation spindle 142, a translation spindle nut 143, and a translation slider 144. The translation motor is arranged for directly or indirectly turning, driving and/or rotating Rtc the translation spindle. The translation slider may translate along the frame in a translation direction Tc translating the container typically substantially equal to the first coupling axis. The translation slider is typically rotationally fixated to the frame. The slider may slide along the frame in a direction of the first coupling axis. The translation spindle nut is typically rotationally fixated to the slider. The translation motor may be fixated to the frame with one end and have an axis rotating Rtc relative to the frame. When the translation spindle rotates, the translation spindle nut travels along the translation spindle for inducing a translation Tc of the translation spindle nut and may induce a translation Tc of the translation slider. Translating is moving one object relative to another object along a straight line or substantially straight line.

The bias means are arranged for biasing the first Luer coupling end and the second Luer coupling end when in contact in a direction of the first coupling axis. The bias means may comprise a spring 151. The bias means, such as the spring, may be arranged between the translation slider and the translation spindle nut. The bias means typically provide a rotational fixation of the translation slider and the translation spindle nut. Typically, if the translation slider and the translation spindle nut translate over the same distance, the bias provided by the bias means remains the same. Typically, if the translation slider and the translation spindle nut translate over an unequal distance, the bias provided by the bias means changes. The bias means typically provide a limited amount of translational freedom between the translation spindle nut and the translation slider.

After bringing the first Luer coupling end and the second Luer coupling end in contact, the translation slider may be translated or moved in a direction necessary for bringing the first Luer coupling end and the second Luer coupling end in contact and/or in a direction further pressing the first Luer coupling and the second Luer coupling end together. The effect of the bias means is that this translation induces a bias biasing the contacting the first Luer coupling end and the second Luer coupling end together or towards each other. After biasing the first Luer coupling end and the second Luer coupling end, the rotation actuator may be activated for establishing the Luer coupling between the first Luer coupling end and the second Luer coupling end. Depending on the amount of bias, the translation actuator may be activated during this rotation loosely associated with the rate of rotation of the rotation actuator, or may even remain stationary or unpowered during rotation of the rotation actuator. This provides the advantage of simplifying or easing the control over the rotation actuator and the translation actuator.

The compounding system may comprise a position sensor 160. The position sensor is arranged for sensing a container holder position of the container holder relative to the Luer coupling holder along the first coupling axis and/or translation container direction Tc. The position sensor may comprise a detector 161, and a detector strip 162. The detector strip may be fixated on the translation slider. The detector may be fixated to the frame. The detector is typically arranged to the detector strip such that the position and/or the change of the position of the slider relative to the frame may be measured. Typically, the first Luer coupling end relative to the Luer container holder is known, predefined or can be deduced. Typically, the second Luer coupling end relative to the Luer coupling holder is known, predefined or can be deduced.

Alternatively, a method for deducing when the first Luer coupling end and the second Luer coupling end contact may comprise the steps of: translating the first Luer coupling end and the second Luer coupling end towards each other; detecting during translating when the position sensor does not sense a change in position; and if no change of position is sensed optionally stopping translating towards each other. When the position sensor does not sense a change in position, the first Luer coupling end and the second Luer coupling end contact each other. Furthermore, if during the translation towards each other at first instance a position change is sensed, the method may be stopped when the first Luer coupling end and the second Luer coupling end first make contact with each other. This advantageously allows to control the amount of bias and/or indentation provided by the bias means. The method may also comprise the steps of before translating towards each other, translating the first Luer coupling end and the second Luer coupling end away from each other; detecting during translating away from each other when the position sensor does sense a change in position; and if a change of position is sensed stopping translating away from each other. When the position sensor does sense a change in position, the first Luer coupling end and the second Luer coupling end do not contact each other. With the additional steps, the first moment of contact may be determined even when the first Luer coupling end and the second Luer coupling end contact each other at the start of the method. The preceding additional method steps may also only be performed if when first translating the first Luer coupling end and the second Luer coupling end towards each other, it is detected that the first Luer coupling end and the second Luer coupling end are already in contact. The method may comprise the step of continuing translating the first Luer coupling end and the second Luer coupling end towards each other for a predefined distance and/or time. This step advantageously provides a specified or predetermined amount of bias and/or indentation.

The container such as a syringe may comprise a plunger 15. The plunger is typically arranged partly in the container body for controlling the volume held in the container body. The compounding system may comprise container fill means 170. The container fill means are arranged for controlling the filling and/or volume contained in the container, typically the container body. The container fill means may comprise a plunger motor 171, a plunger spindle 172, a plunger holder 173, and a plunger slider 174. The plunger slider may be rotationally fixated to the translation slider. The plunger slider may be translationally and/or movable along the translation slider. The plunger holder is shaped and arranged for holding the plunger and/or any other means controlling the volume of the container. The plunger slider and the plunger holder may form a single body and are typically fixated relative to each other. The plunger motor may be fixated at one end to the translation slider. The plunger motor may directly or indirectly rotate Rtp or drive a plunger spindle. The plunger slider may comprise an opening with a thread engaging the plunger spindle. When the plunger spindle is rotated, the plunger slider and thus the plunger is translated Tp along an axis equal or substantially equal to the first coupling axis.

Figure 4:
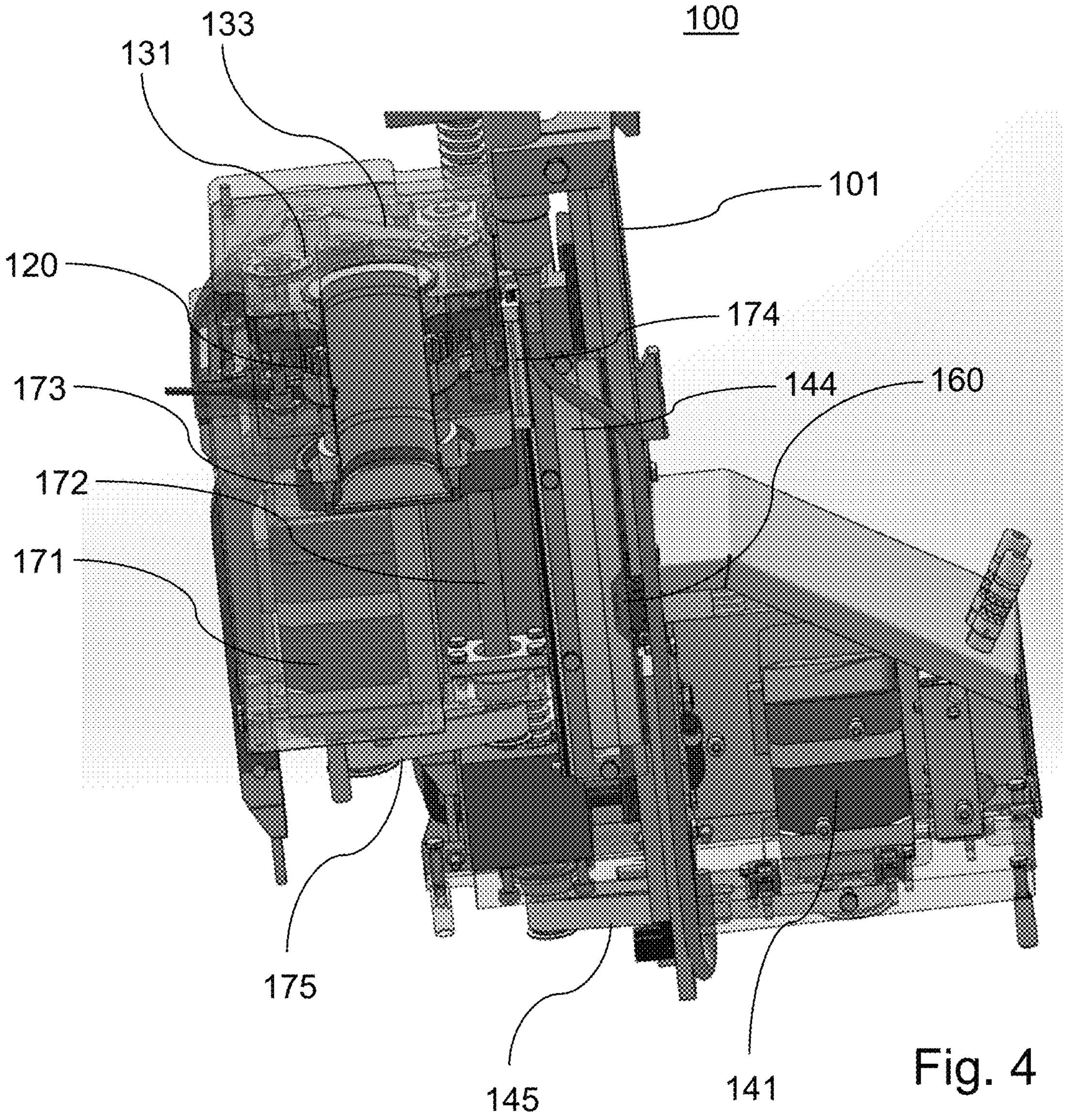
FIG. 4 schematically shows a perspective view of a compounding system.

FIG. 4 schematically shows a perspective view of a compounding system 100. Parts of the compounding system are shown transparent. Parts of the compounding system are shown translucent or not shown. Parts of the compounding system are left out for clarity purposes only without impeding the disclosure of the invention. Shown is an embodiment wherein the translation actuator comprises a translation belt 145 for indirectly driving or rotating the translation spindle. Shown is an embodiment wherein the rotation actuator comprises a rotation belt 133 for indirectly driving or rotating the container holder. Shown is an embodiment wherein the container fill means comprise a plunger belt 175 for indirectly driving or rotating the plunger spindle.

Figure 5:
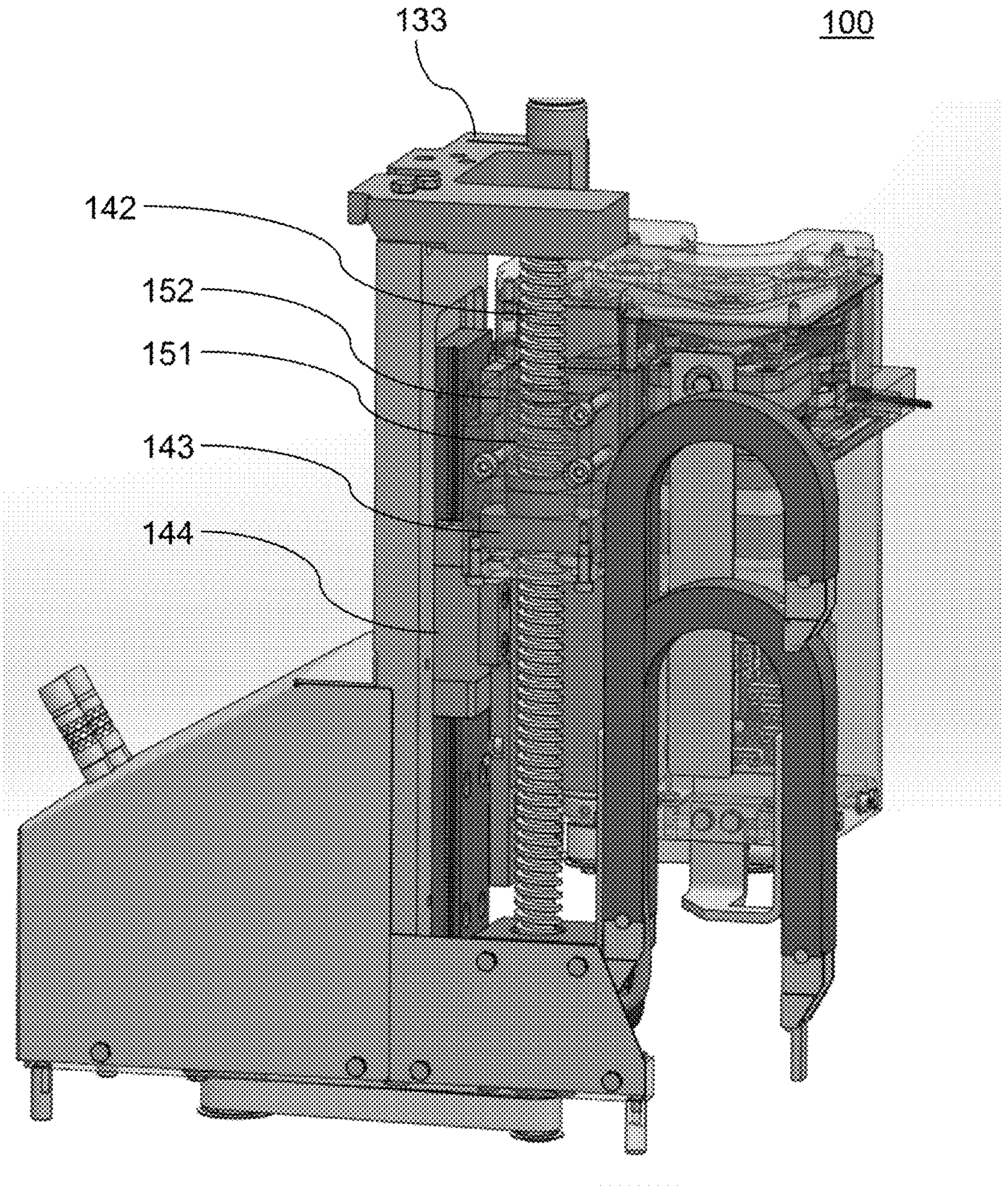
FIG. 5 schematically shows a perspective view of a compounding system.

FIG. 5 schematically shows a perspective view of a compounding system 100. Parts of the compounding system are shown transparent. Parts of the compounding system are shown in a cross-sectional view. Parts of the compounding system are left out for clarity purposes only without impeding the disclosure of the invention. Shown is an embodiment wherein the bias means comprise a spring holder 152. The spring holder is fixated or an integral part of the translation slider. The spring holder comprises a through hole for arranging the translation spindle in this through hole. The through hole is stepped, such that the spring arranged in the through hole abuts on one end of the stepped through hole and abuts on the other end of the through hole on the translation spindle nut arranged on the other end of the stepped through hole. The translation spindle nut is arranged in the spring holder such that the translation spindle nut may translate inside the stepped through hole opening relative to the spring holder but is limited or prevented from rotating relative to the spring holder. This allows for a simple and effective bias means. The spring holder, spring and translation spindle nut are typically arranged such that gravity provides compression for simplifying the design of the bias means.

Figure 6:
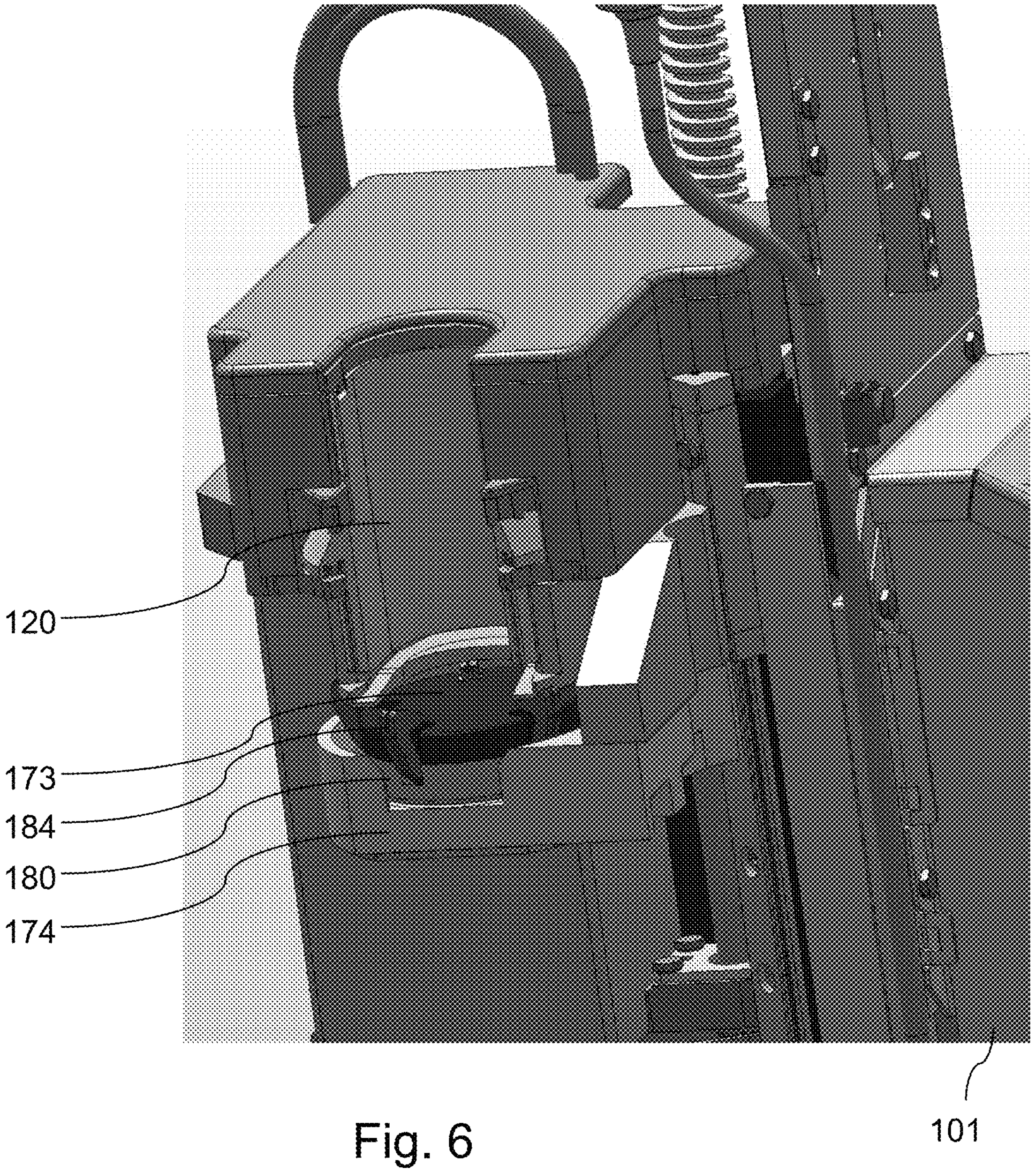
FIG. 6 schematically shows a perspective view of a detail of a compounding system.

FIG. 6 schematically shows a perspective view of a detail of a compounding system typically according to a compounding system as shown in FIGS. 2-5. The figure shows the frame 101, the container holder 120, and the plunger holder 173. The plunger holder and the container holder are translatable along an elongated axis relative to the frame. The plunger holder and the container holder are also translatable along the elongated axis relative to each other for drawing fluid into the container or expelling fluid from the container.

The plunger holder comprises plunger holder rotational means 180 for rotatable arranging the plunger holder typically with a plunger placed in the plunger holder along its elongated axis and/or rotational axis. The container holder is also rotatable around the elongated axis and/or rotational axis. The rotation of the container holder may be motor driven. The rotation of the container holder is typically used for establishing a Luer coupling between the container body and the compounding system. When the container holder is rotated, the plunger holder is also rotated such that the plunger rotates together with the container body. The plunger rotating together with the container body prevents leakage of the fluid in the container as well as unwanted changes of the container volume. Thus, that the plunger is arranged in the container body such that the plunger rotates together with the container body improves keeping the fluid volume stable in the container while coupling and decoupling the container.

Figure 7:
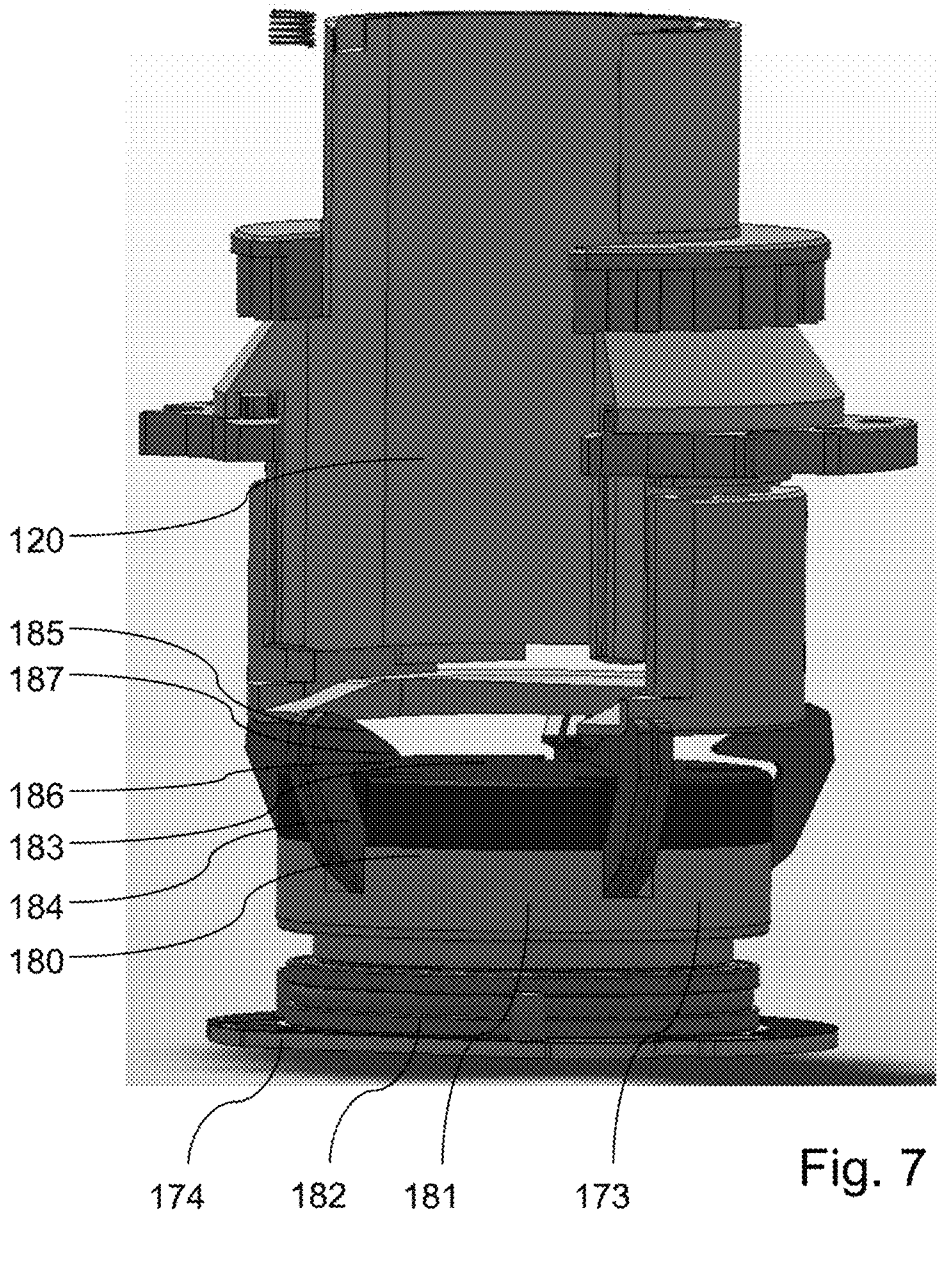
FIG. 7 schematically shows a perspective view of a detail of a compounding system.

FIG. 7 schematically shows a perspective view of a detail of a compounding system typically according to a compounding system as shown in FIGS. 2-7. Furthermore, parts of the compounding system are hidden to present plunger holder 173 and the container holder 120. A part of the plunger slider 174 is shown.

The plunger holder 173 comprises plunger holder rotational means 180. The plunger holder rational means comprise a first rotational part 181 and a second rotational part 182 mounted and/or arranged rotationally relative to each other. The first rotational part comprises a plunger platform 183, and at least one plunger hook 184. In a preferred embodiment the first rotational part comprises five plunger hooks preferably evenly spaced out over and arranged to the edge of the platform.

The top shape 185 of the plunger hooks is such that when the plunger platform moves towards the plunger along the rotational axis and/or elongated axis, the plunger hooks are forced outwards. The top shape of the hook is such that the tip 187 of the hook is always lower compared to the contact point of the plunger contacting the top shape. Typically, the angle of the shape at the contact point is over 10 degrees, preferably over 20 degrees, more preferably over 30 degrees. The top shape may be a curved shape to accommodate the changing position of the plunger hook while the contact point of the plunger contacting the plunger hook changes when the plunger is pushing the plunger hook outwards. The bottom shape 186 of the plunger hooks is such that when the plunger is on the plunger platform and is pulled from the plunger platform along the elongated axis and/or rotational axis, the arrangement, specifically the geometry and/or the shape of the plunger hook together with the positioning and/or the pivot point of the plunger hook relative to the plunger platform, is arranged to form a self-closing mechanism around a plunger, typically an end of the plunger extending from the container body. The bottom shape of the hook is such that from the tip 187 of the hook towards the edge of the plunger kept by the hook that typically only the tip contacts the plunger.

Figure 8:
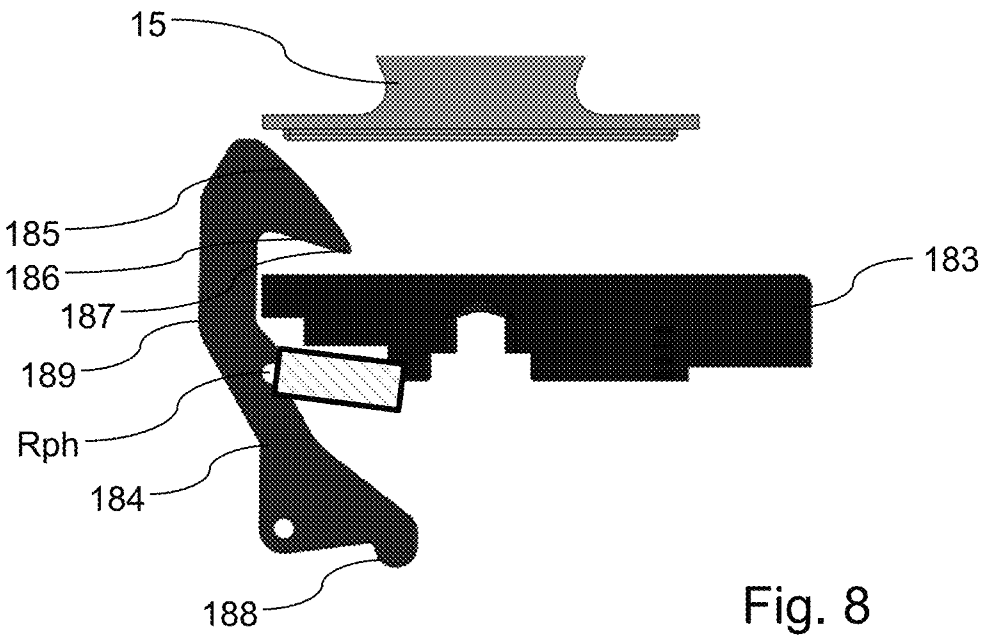
FIG. 8 schematically shows a cross-sectional view of a detail of a compounding system.

FIG. 8 schematically shows a cross-sectional view of a detail of a compounding system. More specific, FIG. 8 shows a cross-sectional detail of FIG. 7 showing one plunger hook 184, part of the plunger platform 183, and part of the plunger. The plunger is shown above the plunger platform. The plunger is not hooked in this situation.

Figure 9:
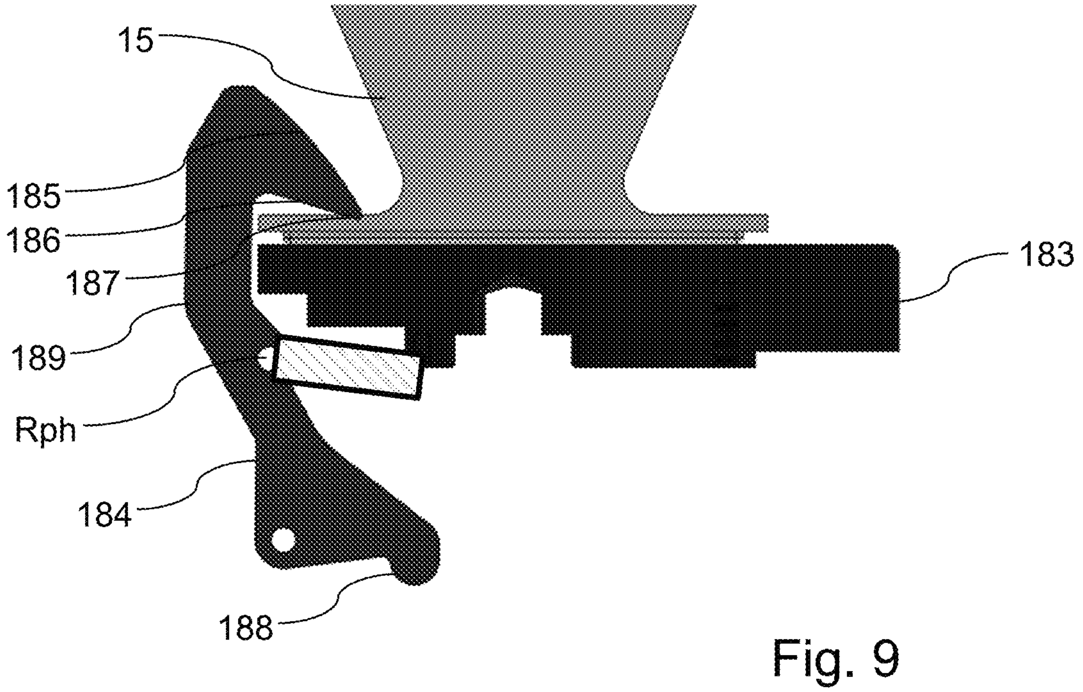
FIG. 9 schematically shows a cross-sectional view of a detail of a compounding system.

FIG. 9 schematically shows a cross-sectional view of a detail of a compounding system. More specific, FIG. 9 shows a cross-sectional detail of FIG. 7 showing one plunger hook 184, part of the plunger platform 183, and part of the plunger. The plunger is shown on the plunger platform. The plunger is hooked in this situation.

When the plunger starting in a position as shown in FIG. 8, is pressed down towards and upon the plunger platform, the top shape of the plunger hook together with the plunger hook rotational axis Rph will cause the plunger hook to rotate out of the way of the plunger, more specific the plunger end, such that the plunger settles on the plunger platform. As soon as the plunger is past the tip of the plunger end, the plunger hook may rotate back to hook the plunger, more specific plunger end. Pressing the plunger down towards and upon the plunger platform may be performed by translating the plunger slider 174 relative to the translational slider 144 for adding functionality to already present actuators for other functionality for advantageously simplifying the compounding system. This pressing down of the plunger is typically done while the plunger is in an end position or pressed in the end position. The end position may be the position of the plunger in the container body wherein the container has the smallest internal volume.

Further, when the plunger starting in a position as shown in FIG. 9, is pulled upwards from the plunger platform, the bottom shape of the plunger hook together with the plunger hook rotational axis Rph will cause the plunger hook to grip the plunger, more specific the plunger end, such that the plunger remains on the plunger platform. Typically, the plunger is released from the plunger platform by means actively rotating the plunger hook away.

The plunger hook 184 may comprise a plunger hook body 189 and a plunger hook release 188. The plunger hook release may be shaped as a protrusion from the plunger hook body. The plunger platform may be moved downwards pressing the plunger hook release onto an abutment for letting the plunger hook and thus the plunger hook tip rotate away from the plunger and plunger platform, such that a subsequent translation of the plunger away from the plunger platform releases the plunger from the plunger platform.

Figure 10:
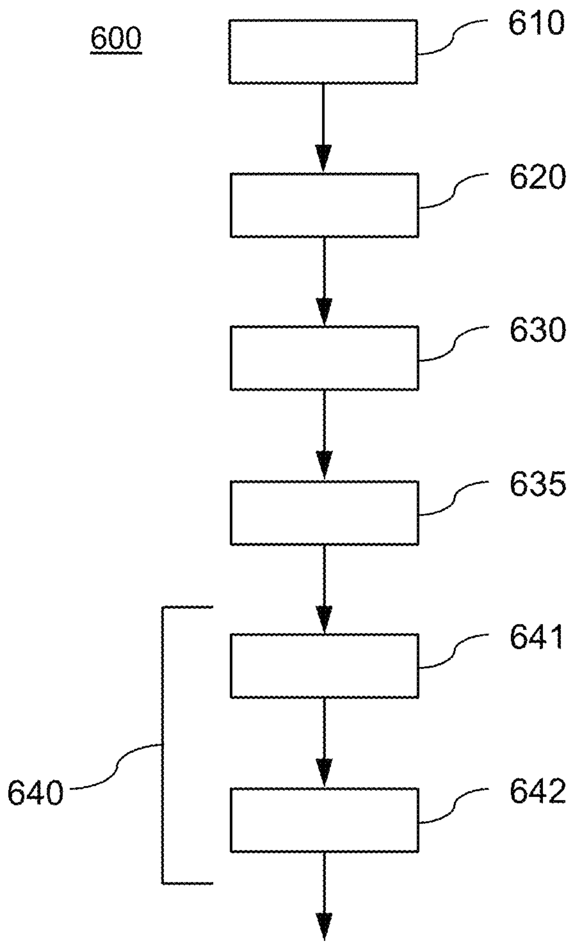
FIG. 10 schematically shows a method for a compounding system.

FIG. 10 schematically shows a method 600 for a compounding system 100. The method comprises arranging 610 the container body in the container body holder. The method further comprises arranging 620 the plunger in the plunger holder. The arranging of the container body and the plunger in their respective holders may be done at least partly in parallel or simultaneous. The arranging of the container body and the plunger in their respective holders may be done consecutively in any order. The method further comprises engaging 630, preferably after arranging, the container body bias means and/or the plunger bias means. The engaging may alternatively be done at least partly during arranging. The method further comprises moving 640, after arranging, the plunger relative to the container body for dosing a compound. The engaging is preferably done before moving, but should at least be done before the moving has finished for preventing creeping, shifting or moving of the plunger relative to the container body and thereby changing the container volume after moving.

In a further implementation of the method, the method comprises moving 635, after arranging, the plunger relative to the container body for decreasing the container volume before moving for dosing. This moving may be labelled as nulling. Typically, the container volume is decreased to its minimum.

In a further implementation of the method, moving 640 for dosing comprises the steps of: increasing 641 the container volume such that the container volume is larger than required dose of compound; and decreasing 642 the container volume such that the container volume is equal to the required dose compound. This implementation of the method causes an overshoot in the dosed compound in the container. This overshoot causes the residual force after the dosing to be less than compared to moving for dosing without overshoot. This reduction in residual force reduces the creeping, shifting and/or moving of the plunger relative to the container body after dosing and thus has the technical effect of increasing the accuracy of the container volume and thus the dosed compound.

Figure 11:
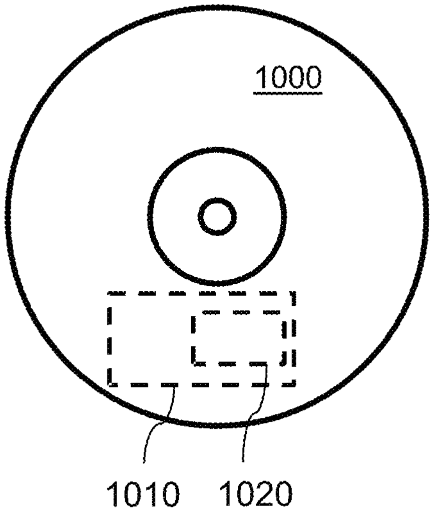
FIG. 11 schematically shows an embodiment of a computer program product, computer readable medium and/or non-transitory computer readable storage medium according to the invention.

FIG. 11 schematically shows an embodiment of a computer program product 1000, computer readable medium 1010 and/or non-transitory computer readable storage medium according to the invention comprising computer readable code 1020. The compounding system typically comprises a controller arranged for executing one or more of the methods as specified throughout the description and claims as typically coded in software.

It will also be clear that the above description and drawings are included to illustrate some embodiments of the invention, and not to limit the scope of protection. Starting from this disclosure, many more embodiments will be evident to a skilled person without departing from the scope of the invention as set forth in the appended claims. These embodiments are within the scope of protection and the essence of this invention and are obvious combinations of prior art techniques and the disclosure of this patent. Devices functionally forming separate devices may be integrated in a single physical device.

The term “substantially” herein, such as in “substantially all emission” or in “substantially consists”, will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" also includes embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. Thus, these terms are not necessarily intended to indicate temporal or other prioritization of such elements.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and "to include", and its conjugations does not exclude the presence of elements or steps other than those stated in a claim. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The article "a" or "an" preceding an element does not exclude the presence of a plurality of such elements.

The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterising features described in the description and/or shown in the attached drawings. The invention further pertains to a method or process comprising one or more of the characterising features described in the description and/or shown in the attached drawings.

It will be appreciated that the invention also applies to computer programs, particularly computer programs on or in a carrier, adapted to put the invention into practice. The program may be in the form of a source code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

The various aspects discussed in this patent can be combined in order to provide additional advantages. The mere fact that certain measures are recited in mutually different claims does not indicate that a combination of these measures cannot be used to advantage. Furthermore, some of the features can form the basis for one or more divisional applications.

The invention claimed is:

1. A compounding system for dosing a compound in a container comprising:

a container body enclosing a container volume for holding the compound;

a first coupling part; and a plunger adapted to change the container volume;

wherein the compounding system comprises:

a container body holder for holding the container body;

a plunger holder for holding the plunger;

a frame; and a coupling holder for holding a second coupling part for coupling with the first coupling part for forming a coupling;

wherein increasing the container volume causes a negative pressure in the container volume resulting in a residual force directed to move container body holder and plunger holder towards each other, and/or wherein decreasing the container volume causes a positive pressure in the container volume resulting in a residual force directed to move container body holder and plunger holder away from each other; and wherein the compounding system further comprises:

plunger bias means providing a plunger bias for biasing the plunger in the plunger holder for preventing creep based on the residual force, wherein the residual force is less than the plunger bias; and plunger holder rotational means for allowing the plunger to rotate relative to the frame for coupling;

characterized in that the compounding system further comprises:

container body bias means providing a container body bias for biasing the container body in the container body holder for preventing creep based on the residual force, wherein the residual force on the plunger relative to the container body after changing the container volume is less than the container body bias; and container body holder rotational means for allowing the container body, together with the container body bias means, to rotate relative to the frame for coupling.

2. The compounding system of claim 1, wherein the compounding system comprises the container body bias means, the container body holder rotational means, the plunger bias means and the plunger holder rotational means; or wherein the first coupling part and the second coupling part are Luer coupling parts for forming a Luer coupling.

3. The compounding system of claim 1, comprising:

a plunger slider arranged for sliding the plunger holder relative to the container body holder; and a plunger motor arranged for controlling sliding of the plunger slider.

4. The compounding system of claim 1, wherein the container body bias means are arranged such that the absolute value of the container body bias exceeds the absolute value of the residual force generated by the difference between the maximum container volume and the minimum container volume; or wherein the container body bias means are arranged such that the absolute value of the plunger bias exceeds the absolute value of the residual force generated by the difference between the maximum container volume and the minimum container volume.

5. The compounding system of claim 1, wherein the compounding system comprises a plunger slider translationally coupled to the frame;

wherein the plunger holder rotational means comprise a first rotational part fixated to the plunger holder, and a second rotational part fixated to the plunger slider;

wherein the first rotational part and the second rotational part are rotationally arranged such that when the container is present and the container body holder is rotated, the plunger follows a rotation of the container body and wherein the plunger holder rotational means are passive.

6. The compounding system of claim 1, wherein the container body has an elongated shape;

wherein the elongated shape defines an elongated axis; and wherein the elongated axis aligns with the plunger.

7. The compounding system of claim 6, wherein the plunger holder rotational means define a rotational axis substantially the same as the elongated axis.

8. The compounding system of claim 1, wherein the plunger holder comprises a plunger platform for placing the plunger onto the platform; and wherein the plunger bias means comprises:

at least one plunger hook for hooking the plunger holder onto the platform; and a with each plunger hook associated plunger spring arranged for together with the associated hook providing the plunger bias.

9. The compounding system of claim 8, wherein the at least one plunger hook is rotationally arranged for rotating around the platform;

wherein the platform comprises an edge; and wherein the at least one plunger hook is arranged at the edge of the platform.

10. The compounding system of claim 8, wherein the at least one hook is positionable in an open position wherein a plunger is placeable on the platform, and a closed position wherein the plunger bias is applied to the plunger; and wherein the at least one hook is shaped such that while the plunger is placed onto the platform along the rotational axis, the at least one hook is forced from the closed position to the open position; or wherein the at least one hook is shaped such that when a plunger is placed on the platform and the hook is in the closed position, a pulling force on the plunger away from the platform causes the at least one hook to firmer grip the plunger or at least not release its grip on the plunger.

11. The compounding system of claim 1, wherein the container body bias means or the plunger bias means comprise a spring, a leaf spring, a recoil spring, a coil, an elastic member or a resilient member for biasing the container body or the plunger onto the container body holder or the plunger holder, respectively.

12. The compounding system of claim 1, wherein the container body bias means or the plunger bias means comprise a thread and a fixation for screwing the fixation onto the container body or plunger for biasing the container body or the plunger onto the container body holder or the plunger holder, respectively.

13. The compounding system of claim 1,
wherein the container body comprises flanges extending from the container body; and
wherein the container body holder is shaped for receiving the flanges for holding or gripping the container.

14. The compounding system of claim 1,
wherein the plunger comprises a flange; and
wherein the plunger holder is shaped for receiving the flange for holding or gripping the plunger.

15. The compounding system of claim 1,
wherein the plunger has an elongated shape having an elongated axis and is shaped to be arranged at least partly inside the container body;
wherein the plunger is piston shaped and is shaped to snugly fit at least partly inside the container body;
wherein the plunger holder moves relative to the container body holder for changing the container volume;
wherein the container is a medical container, such as a syringe; or
wherein the compounding system comprises a loading bay for loading a reservoir for holding a supply of the to be dosed compound or an ingredient of the to be dosed compound.

16. A method for using a compounding system according to claim 1,
wherein the method comprises the step of keeping the container body holder and the plunger holder stationary relative to each other after changing the container volume;
wherein the maximum absolute value of the residual force is less than or equal to a negative pressure or a positive pressure generated by the difference between the maximum container volume and the minimum container volume; or
wherein the method comprises the steps of
providing the container body bias such that the absolute value of the container body bias exceeds the absolute value of the residual force generated by the difference between the maximum container volume and the minimum container volume; or
providing the plunger bias such that the absolute value of the plunger bias exceeds the absolute value of the residual force generated by the difference between the maximum container volume and the minimum container volume.

17. A method for a compounding system for dosing a compound in a container comprising:
a container body enclosing a container volume for holding the compound;
a first coupling part; and
a plunger adapted to change the container volume;
wherein the compounding system comprises:
a container body holder for holding the container body;
a plunger holder for holding the plunger;
a frame; and
a coupling holder for holding a second coupling part for coupling with the first coupling part for forming a coupling;
wherein increasing the container volume causes a negative pressure in the container volume resulting in a residual force directed to move container body holder and plunger holder towards each other, and/or wherein decreasing the container volume causes a positive pressure in the container volume resulting in a residual force directed to move container body holder and plunger holder away from each other;
wherein the compounding system further comprises:
container body bias means providing a container body bias for biasing the container body in the container body holder for preventing creep based on the residual force, wherein the residual force on the plunger relative to the container body after changing the container volume is less than the container body bias;
container body holder rotational means for allowing the container body, together with the container body bias means, to rotate relative to the frame for coupling;
plunger bias means providing a plunger bias for biasing the plunger in the plunger holder for preventing creep based on the residual force, wherein the residual force is less than the plunger bias; and
plunger holder rotational means for allowing the plunger together with the plunger bias means, to rotate relative to the frame for coupling; and
wherein the method comprises:
arranging the container body in the container body holder;
arranging the plunger in the plunger holder;
engaging, after arranging, the container body bias means and/or the plunger bias means; and
moving, after arranging, the plunger holder relative to the container body holder for dosing a compound.

18. The method of claim 17, further comprising the steps of: moving, after arranging, the plunger holder relative to the container body holder for decreasing the container volume before moving for dosing; and
wherein moving for dosing comprises the steps of:
increasing the container volume such that the container volume is larger than required dose of compound; and
decreasing the container volume such that the container volume is equal or substantially equal to the required dose of compound.

19. The method of claim 17,
wherein the method comprises the step of keeping the container body holder and the plunger holder stationary relative to each other after changing the container volume;
wherein the maximum absolute value of the residual force is less than or equal to a negative pressure or a positive pressure generated by the difference between the maximum container volume and the minimum container volume; or
wherein the method comprises the step of:
providing the container body bias such that the absolute value of the container body bias exceeds the absolute value of the residual force generated by the difference between the maximum container volume and the minimum container volume; or
providing the plunger bias such that the absolute value of the plunger bias exceeds the absolute value of the residual force generated by the difference between the maximum container volume and the minimum container volume.

* * * * *